APPARATUS TO MEASURE THE PERIOD OF AN INPUT SIGNAL

Original Filed March 4, 1960

INVENTOR
P. S. BENGSTON

ATTORNEY

Sept. 20, 1966 P. S. BENGSTON 3,274,500

APPARATUS TO MEASURE THE PERIOD OF AN INPUT SIGNAL

Original Filed March 4, 1960 3 Sheets-Sheet 2

INVENTOR.
P. S. BENGSTON

BY [signature]

ATTY.

Sept. 20, 1966

P. S. BENGSTON 3,274,500

APPARATUS TO MEASURE THE PERIOD OF AN INPUT SIGNAL

Original Filed March 4, 1960

3 Sheets-Sheet 3

INVENTOR.
P. S. BENGSTON

BY [signature]

ATTY.

United States Patent Office 3,274,500
Patented Sept. 20, 1966

3,274,500
APPARATUS TO MEASURE THE PERIOD OF AN INPUT SIGNAL

Phillip S. Bengston, Silver Spring, Md., assignor to the United States of America as represented by the Secretary of the Navy Original application Mar. 4, 1960, Ser. No. 12,876, now Patent No. 3,158,845, dated Nov. 24, 1964. Divided and this application Aug. 31, 1964, Ser. No. 399,955
8 Claims. (Cl. 328—108)

This application is a division of my copending application, Serial No. 12,876 filed March 4, 1960 and now U.S. Patent No. 3,158,845.

The invention described herein may be manufactured and used by or for the Government of the United States of America for governmental purposes without the payment of any royalties thereon or therefor.

This invention relates to a system for discriminating frequency modulated signals recorded on magnetic tape and more particularly for eliminating wow and flutter introduced by the recorder playback apparatus.

This invention also relates to apparatus for obtaining a voltage indicative of the period of a signal.

In addition, this invention relates to a non-linear wave shaping circuit and more particularly to a hyperbolic generator.

Modern telemetering systems employ magnetic tape to store data in the form of frequency modulated signals. When the stored signals are played back, variations in the tape speed and length will cause inaccuracies in the detected signal because the frequency of the potential at the pickup heads will not be indicative of the frequency of the signal originally recorded. These variations are generally referred to as wow and flutter. In the past, several systems have been developed to compensate for wow and flutter. Examples of such apparatus are disclosed in U.S. Patent 2,840,800 issued June 24, 1958 to W. H. Chester, U.S. Patent 2,364,723 issued December 12, 1944 to E. W. Kellogg and the application of D. J. Torpy et al., Serial No. 738,582, filed May 28, 1958. The prior systems either were not sufficiently accurate since they did not have fast response or they utilized considerable, complex equipment. Fast response was not achieved because low pass filters were usually employed to average the signal values. Such filters are unable to respond to respond to variations occurring from cycle to cycle but must relay on variations over a long period of time to produce an accurate indication of the average value of an applied signal.

The present invention obviates the disadvantages of the prior art since no filtering is employed. This is made possible because of the unique circuits employed to average a voltage over only one cycle and to measure the period of an applied potential.

In this novel system, reference and data signals are recorded on a magnetic tape. Any wow and flutter introduced by the recording and playback equipment will appear on both signals when detected by the pickup heads. Each signal is converted into a series of pulses, one pulse being derived for each cycle. The pulses associated with the reference channel are fed into a reference sampler wherein a voltage is derived having an amplitude directly proportional to the period thereof. The output of the reference sampler is gated to a hyperbolic generator everytime a data signal pulse is produced. The average value of the voltage fed into this generator is inversely proportional to the frequency of the reference signal and directly proportional to the frequency of the data signal. The minimum voltage produced by the hyperbolic generator is indicative of the average voltage each cycle the pulse is produced. The minimum voltage produced by the generator is sampled and stored once each data signal cycle. The resulting output signal is commensurate with the original signal compensated for wow and flutter.

The unique hyperbolic generator consists of a plurality of exponential networks. Each of the networks has a different potential initially applied thereto which is stored. After the applied potential is removed the stored voltages will decay exponentially so that at first only one of the networks will be discharging. After the voltage stored in the first network has been sufficiently reduced, the second network will start to decay and the process continues from one network to another. In this way, an output signal is derived that is directly proportional to the amplitude of the applied signal and inversely proportional to the frequency thereof.

The discriminator circuit developed for this use in this invention utilizes a pulse shaping circuit that produces a pair of pulses for every cycle of the applied input. One of the pulses actuates a sawtooth generator and the other pulse actuates a sampling circuit. The sampling circuit samples the sawtooth voltage when energized and stores the sampled voltage from one cycle to another. If the sawtooth voltage should exceed the voltage previously stored, the sampler will follow the increase.

An object of this invention is to provide a unique compensation system for eliminating wow and flutter in magnetic tape playback apparatus.

Another object of this invention is to provide a wow and flutter compensating system having fast unfiltered response.

A further object of this invention is to provide a unique wave shaping circuit.

An additional object of this invention is to provide a circuit to determine the period of a signal.

Other objects and many of the attendant advantages of this invention will be readily appreciated as the same becomes between understood by reference to the following detailed description when considered in connection with the accompanying drawings wherein.

Figure 1:
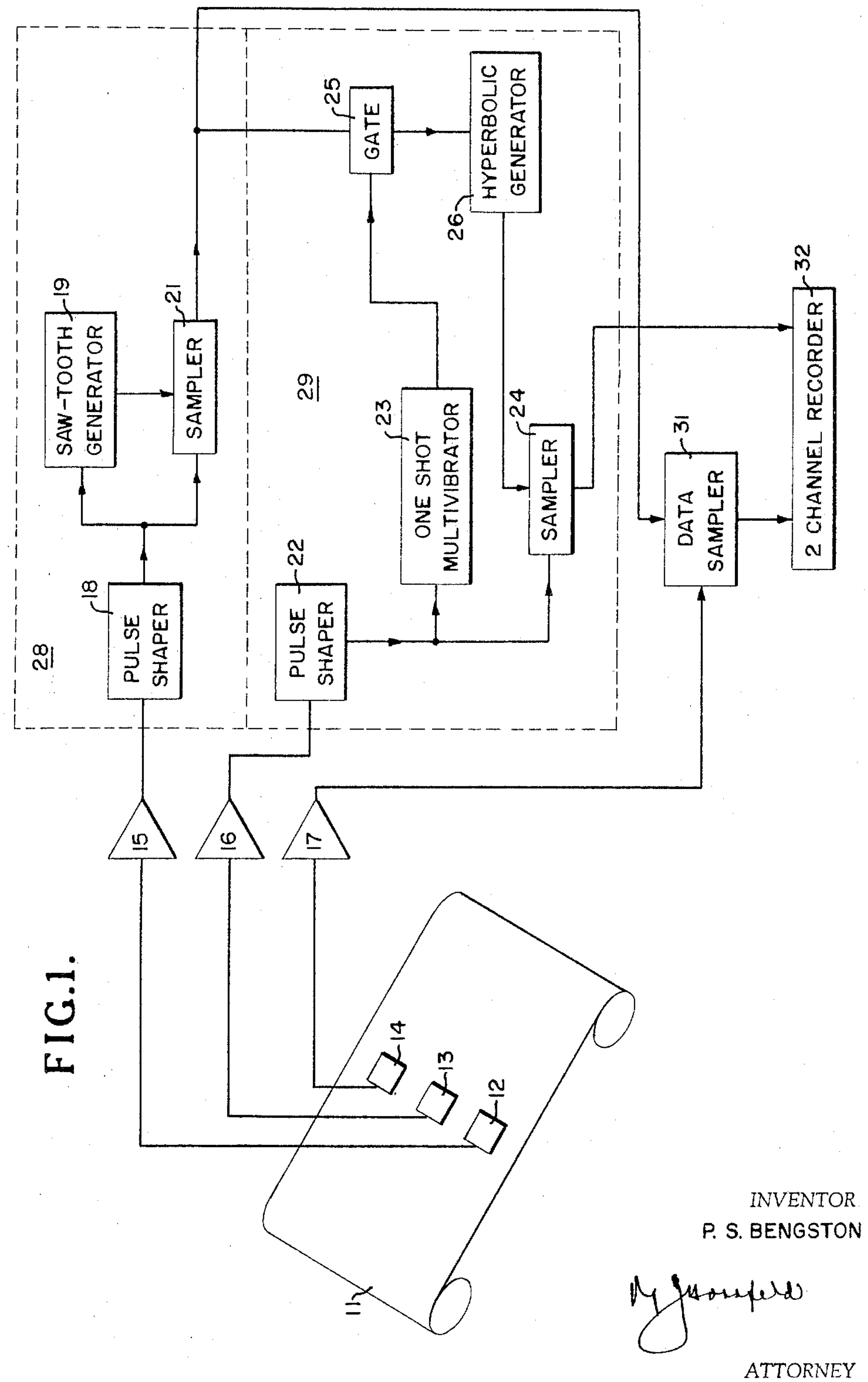
FIG. 1 is a block diagram of the system to compensate wow and flutter.

Referring now to the drawings, wherein like reference characters designate like or corresponding parts throughout the several views, there is shown in FIG. 1 a block diagram of the entire system. Three separate signal channels are recorded on tape 11 which are detected by pickup heads 12, 13 and 14. A reference signal of nominally constant frequency is picked up by head 12 while heads 13 and 14 pick up signals that are frequency modulated in accordance with data. The voltages on heads 12, 13 and 14 are fed to preamplifiers 15, 16 and 17, respectively, which produce rectangular waves in response thereto.

Figure 4A:
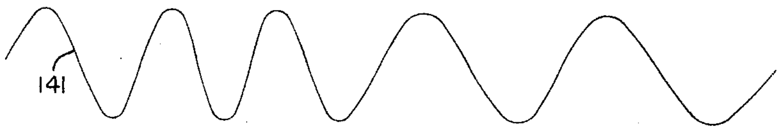
FIG. 4 illustrates voltage waveforms that appear in the circuits.
Figure 4B:
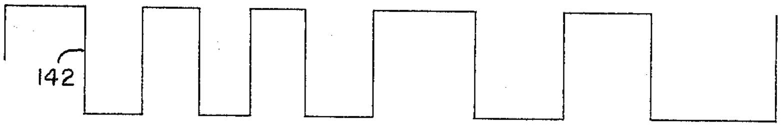
Figure 4C:
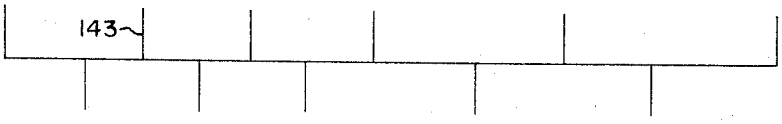
Figure 4D:
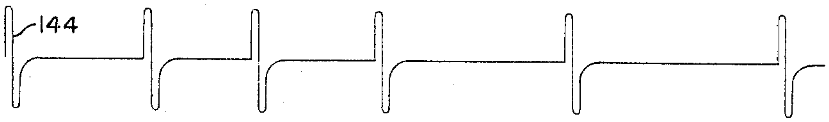
Figure 4E:
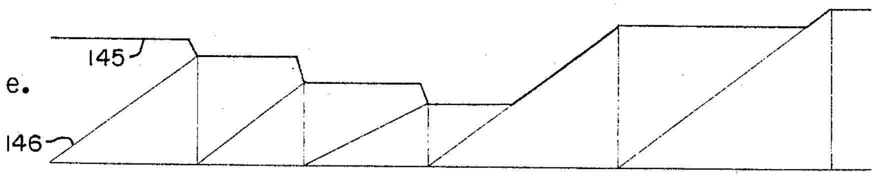

The output of 15, waveform 142 of FIG. 4*b*, is fed to reference sampler 28 which contains pulse shaper 18, sawtooth generator 19 and sampler 21. Shaper 18 generates positive and negative pulses, as shown by 144 in FIG. 4*d*, in response to the leading edge of waveshape 142. The negative pulses actuate sawtooth generator 19 and the positive pulses actuate sampler 21. The sawtooth voltage, FIG. 4*e* waveshape 146, is sampled everytime sampler 21 is actuated and stored therein from one cycle to the next. If the sawtooth voltage exceeds the potential being stored in the sampler 21, it will follow the increased potential as shown in FIG. 4*e* at 145. The resulting output of the reference sampler 28 is fed in parallel to both data samplers 29 and 31.

The amplifiers 16 and 17 are connected to data samplers 29 and 31, respectively. Since the construction of both data samplers is identical, it is deemed necessary to only disclose the components in unit 29.

Figure 4F:
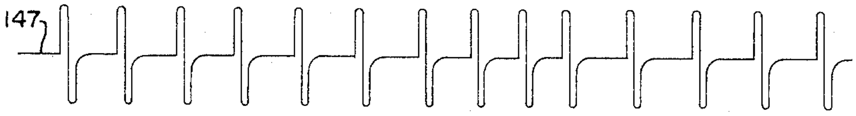

Pulse shaper 22 produces positive and negative pulses, FIG. 4*f*, in response to the square wave applied thereto. Since the data signals are of higher frequency than the reference signal, considerably more pulses will be generated by shaper 22 than by shaper 18. One shot multivibrator 23 produces a constant width pulse in response to the negative pulse applied thereto. The constant width pulse and the output of sampler 21 are combined in gate 25. The gate is opened when the constant width pulse is applied thereto permitting the potential developed by sampler 21 to be fed to hyperbolic generator 26 as shown by the waveform 148, in FIG. 4*g*. It can be shown that the average value of this waveform is directly proportional to the frequency of the data signal and inversely proportional to the frequency of the reference signal, i.e. directly proportional to the period of the reference signal. When the gate is closed the generator will produce a voltage that decreases from the output of sampler 21 inversely with respect to time. Generator 26 is connected to sampler 24 which is actuated by the positive pulses produced by shaper 22. The construction of sampler 24 is almost identical to that of sampler 21 so the minimum value of the hyperbolic signal is stored from one cycle of the data signal to the next. If the hyperbolic signal is less than the potential being stored in sampler 24, the voltage will be followed as shown in FIG. 4*h* by waveshape 151. The resulting output of the data sampler 29 is a signal varying in amplitude commensurate with the data signal and compensated for wow and flutter.

This can be shown as follows: The output of gate 25 is a pulse of constant width and variable amplitude illustrated in FIG. 4*g* as pulses 148. The amplitude is determined by the voltage produced by sampler 21 when multivibrator 23 is producing a pulse. The sampler 21 output is directly proportional to the period of the reference signal, i.e. $kT_R$ as shown by waveform 146 of FIG. 4*e*. Hyperbolic generator 26 produces an output curve that decreases inversely with time between the pulses applied thereto as illustrated by waveform 149 of FIG. 4*g*. The equation of this curve is given as $E_1t_1/t$; where $E_1$ is the amplitude of the voltage applied to generator 26; $t_1$ is the width of the pulse produced by multivibrator 23; and $t$ is time as measured from the leading edge of the pulse 148. The output of generator 26 decreases inversely with time until the next pulse is initiated by multivibrator 23. The time between pulses produced by the multivibrator is equal to the period, $t_d$, [inversely proportional to frequency] of the data signals. Accordingly the minimum output produced by generator 26 is $E_1t_1/t_d$. Since $E_1=kT_R$, $E_1t_1/t_d=kT_Rt_1/t_d$. Thus, the voltage sampled by sampler 24 is compensated for like frequency changes appearing in the reference and data signals. It is also apparent that the output of sampler 24 is the average value of the pulse being fed into hyperbolic generator 26, i.e. $E_1t_1/t_d$.

The data signal picked up by head 14 is fed to amplifier 17 and data sampler 31 where it is combined with the output of reference sampler 28. The compensated output of data samplers 29 and 31 are connected to any suitable read out apparatus such as two channel pen recorder 32.

Figures 2, 3:
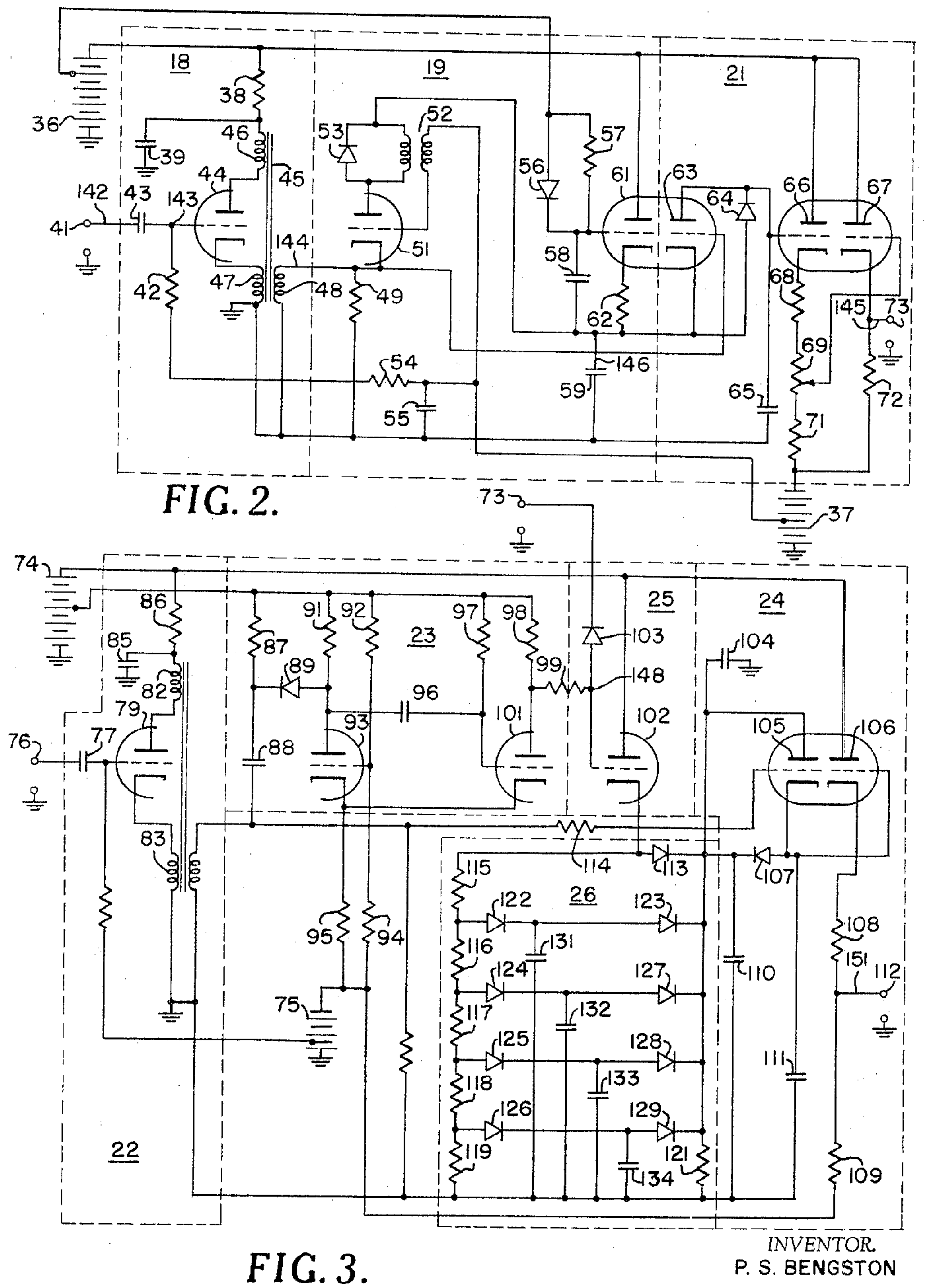
FIG. 2 is a circuit diagram of the reference sample.
FIG. 3 is a circuit diagram of the data sampler.

Reference is now made to FIG. 2 wherein a detailed circuit diagram of reference sampler 28 is illustrated.

Pulse shaper 18 consists of a differentiator comprising capacitor 43 and resistor 42 connected to input terminal 41 and the grid of tube 44. The anode and cathode of tube 44 are connected to the windings 46 and 47, respectively, of transformer 45. Winding 46 is connected to battery 36 through resistor 38 and to ground through condenser 39. These components decouple the pulser from the other circuits. Tube 44 is normally maintained beyond cutoff since it is connected to battery 37 through resistors 42 and 54. Condenser 55 and resistor 54 prevent large variations in the potential of battery 37 when tube 44 is pulsed. Winding 48 of transformer 45 is connected to sawtooth generator 19 and sampler 21.

Sawtooth generator 19 contains a pair of triodes 51 and 61. The cathode of tube 51 is directly coupled to the secondary winding 48 and is connected to ground by way of resistor 49. Diode 53 and transformer 52 connect capacitor 59 to the anode of tube 51. Tube 51 is normally maintained beyond cutoff by battery 37 which is connected to the grid through transformer 52. Diode 53 prevents overshoot when tube 51 is pulsed. The anode of tube 61 is connected directly to battery 36 while the grid is connected to a tap on the battery by a biasing circuit composed of resistor 57 in parallel with diode 56. The grid and cathode of tube 61 are interconnected by capacitor 58 and resistor 62.

The voltage on capacitor 59 is coupled directly to sampler 21 which contains triodes 63, 66 and 67. The cathode of tube 63 is connected directly to capacitor 59. Diode 64 connects the anode and cathode of tube 63 together. The anode of this tube is also coupled to the grid of tube 66 and capacitor 65. The cathode of triode 66 is connected to battery 37 by resistor 68, potentiometer 69 and resistor 71 and the anode thereof is supplied by battery 36. The slider of potentiometer 69 is connected to the grid of triode 67. The cathode of this tube is connected to ground by way of resistor 72 and battery 37, and the anode is also energized by battery 36.

The operation of the reference sampler circuit will now be explained in detail. The rectangular waves 142 of FIG. 4*b* are obtained from the signal 141 of FIG. 4*a* picked up by head 12 of FIG. 1. The rectangular wave is applied to input terminal 41 where it is differentiated by condenser 43 and resistor 42, producing the spikes of FIG. 4*c*. Since tube 44 is biased beyond cutoff only the positive spikes will actuate it. The circuit associated with tube 44 is a triggered blocking oscillator which produces the wavetrain 144 of FIG. 4*d* across the secondary of transformer 48. The positive pulse of wavetrain 144 actuates tube 63 causing the charge stored on capacitor 59 to be transferred to capacitor 65, thus the voltage on capacitor 59 is sampled when the positive pulses are produced by shaper 18. The negative pulses of wavetrain 144 cause tube 51 to conduct, and discharge the voltage on capacitor 59. This capacitor is then charged up again as shown by wavetrain 146 of FIG. 4*e* by battery 36 connected thereto through capacitor 58, resistor 57 and diode 56. It is thus seen that tube 51 and capacitor 59 constitute a bootstrap integrator. When the voltage across capacitor 59 exceeds the voltage stored on capacitor 65, diode 64 will conduct causing the voltage across capacitor 65 to follow any increase that exceeds the value of the previously stored signal, as shown by waveform 145 in FIG. 4*e*. The signal across capacitor 65 is fed into cathode follower tubes 66 and 67. The slider position of potentiometer 69 determines the D.C. level of the output appearing at terminal 73. It is apparent from the foregoing that the voltage at terminal 73 will be directly proportional to the period of the signal applied to input terminal 41.

Reference is now made to FIG. 3 wherein a detailed circuit diagram of a data sampler is illustrated. Pulse shaper 22 is of identical configuration to pulse shaper 18, previously described and explained.

One shot multivibrator 23 comprises tubes 93 and 101. Secondary winding 83 is connected to the anode of tube 93 by way of condenser 88 and diode 89 and to the grid of tube 105 by resistor 114. The anode and grid of tube 93 are connected to battery 74 by resistors 91 and 92, respectively, while the resistors 94 and 95 connect the grid and cathode, respectively, of that tube to negative supply 75. Resistor 87 connects diode 89 and capacitor 88 to a tap on battery 74 to limit the current flow through tube 93. The anode of tube 93 is connected to the grid of tube 101 by condenser 96 and the cathodes of these tubes are connected together. The grid and anode of tube 101 are connected to the tap on battery 74 by resistors 97 and 98, respectively.

The output of the one shot multivibrator 23 is fed from the anode of tube 101 to gate 25 by resistor 99. The gate comprises diode 103 connected to the grid of tube 102. Diode 103 is also connected to terminal 73 which is the output terminal of the reference sampler. The cathode of tube 102 is directly connected to hyperbolic generator 26.

The hyperbolic generator or waveshaper contains a voltage divider having resistors 115–119 connected between the cathode of tube 102 and ground. Diode 113 connects the cathode of tube 102 to load resistor 121. The wave shaper comprises a plurality of networks made up of a pair of series connected diodes such as 122 and 123. Capacitors 131–134 are connected between the respective diodes and ground. Each of the networks is connected to a tap on the voltage divider, i.e. between adjacent resistors thereof and resistor 121.

The sampling circuit 24 contains capacitors 104 and 110 which are connected in parallel with resistor 121 and are also connected to the anode of tube 105. Diode 107 is connected to the cathode of tube 105 which is also connected to storage capacitor 111. The cathode of triode 105 is connected directly to the grid of tube 106. The output of the data sampler is taken between cathode resistors 108 and 109 at terminal 112.

The operation of the data sampler 24 will now be explained in detail. Square waves obtained from the data signal are applied to terminal 76 of shaper 22 which produces wave train 147 of FIG. 4*f*. It is noted that the pulses of FIG. 4*f* are similar to those of FIG. 4*d*. The number of pulses in the former is greater than the number in the latter because the frequency of the data signal is greater than the frequency of the reference signal. Of course, it is understood that wave shapes of the same type as shown in FIGS. 4*a–c* are associated with the wavetrain of FIG. 4*f* since the apparatus to produce that wavetrain is like that to produce the wavetrain of FIG. 4*d*. The positive pulse produced by shaper 22 renders tube 105 conductive so the charge stored on capacitors 104 and 110 is transferred to capacitor 111. The negative pulse produced by sampler 22 is coupled to the anode of triode 93 and the grid of triode 101 and causes tube 101 to cut-off and tube 93 to conduct heavily. Of course, it is understood the positive pulse will not effect tubes 93 and 101. Tube 93 will continue to conduct after the pulse has subsided and will remain conducting until the voltage on the grid of tube 101 has risen sufficiently to render that tube conductive. When tube 101 is conducting a constant voltage is applied to the grid of triode 102. When the pulse is produced the anode voltage of tube 101 is increased to the potential of the tap on battery 74. This increase in voltage limits the input of tube 102 to the voltage on terminal 73. Thus the output of the reference sampler is gated through tube 102 to the hyperbolic generator 26.

The pulse output of triode 102 is applied to capacitors 131–134 through diodes 122–126, respectively. Because of the voltage divider composed of resistors 115–119 the largest voltage is applied to capacitor 131 and successively smaller voltages are applied to the other capacitors and stored by them. When the pulse is removed capacitor 131 will begin to discharge through diode 123 and resistor 121. Initially the other capacitors will not discharge because the voltage on the cathodes of diodes 127–129 will be greater than on the anodes thereof, i.e. equal to the voltage across capacitor 131. As the voltage across 131 decreases it will become equal to that stored on capacitor 132 and diode 127 will be rendered conductive. This operation continues for the networks associated with capacitors 133 and 134 so that the output on load resistor 121 is a hyperbolic function, i.e. the voltage decreases inversely with time. Of course it is understood that any other suitable function can be obtained by the use of this type of network by properly choosing the component values. Also, the accuracy of such a generator increases with the number of networks employed.

Figure 4G:
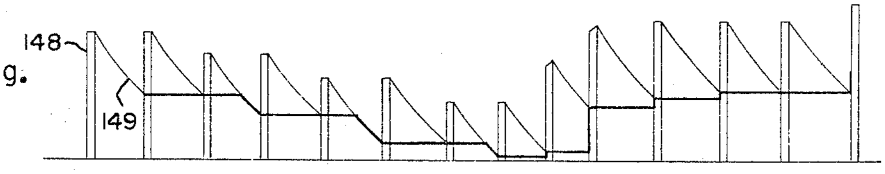
Figure 4H:
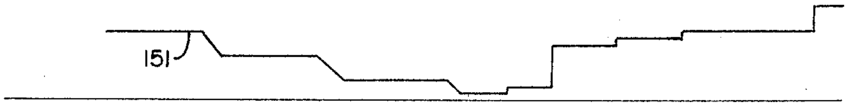

The output of hyperbolic generator, FIG. 4*g*, waveform 149 is fed to sampler 24. The construction and functioning of sampler 24 is similar to that of sampler 21. However, since a decreasing voltage is applied to sampler 24 the plate capacitor thereof is connected to the input and the storage or output capacitor is connected to the cathode of triode 105. When the voltage across capacitors 104 and 110 becomes less than the potential stored on capacitor 111, diode 107 conducts causing the potential across capacitor 111 to follow any decrease that is less than the value of the previously stored signal, as shown by waveform 151 in FIG. 4*h*. The voltage on the cathode of triode 105 is fed into cathode follower 106 resulting in a direct voltage varying in amplitude in accordance with the frequency of the data signal and compensated for wow and flutter introduced by the recording equipment.

Obviously many modifications of the present invention are possible in the light of the above teachings. It is understood that any desired number of channels can be recorded on tape 11. When the number of channels is altered, the corresponding number of data samplers and a pen recorder having the appropriate number of output channels must be employed. If desired, one of the data channels may also contain a timing signal. Of course the batteries may be replaced by any suitable power supply.

It should be understood, of course, that the foregoing disclosure relates to only a preferred embodiment of the invention and that numerous modifications or alterations of the invention may be made without departing from the spirit and scope of the invention as set forth in the appended claims.

What is claimed as new and desired to be secured by Letters Patent of the United States is:

1. Apparatus to measure the period of a signal comprising first means to produce positive and negative pulses for each cycle of a signal applied thereto, generator means coupled to said first means to initiate a saw-tooth voltage in response to a pulse of one polarity, said sawtooth voltage having a peak value and sampling means coupled to said first means and to said generation means for sampling the saw-tooth voltage when the pulse of the other polarity occurs, whereby an output produced by said sampling means is indicative of the period of the signal applied to said first means.

2. The apparatus of claim 1 wherein the positive and negative pulses are of short duration and one occurs immediately after the other.

3. The apparatus of claim 2 wherein said sampling means includes means to store the peak value of the saw-tooth voltage, and means to follow the saw-tooth voltage when a previously stored peak value is exceeded.

4. The apparatus of claim 2 wherein said sampling means comprises a vacuum tube having an anode, a grid connected to said first means and a cathode connected to said generator means, a diode connected between the cathode and anode of said tube, a first capacitor having one side connected to the cathode of said tube, and a second capacitor connected between the anode of said tube and the other side of said first capacitor.

5. Apparatus to measure the period of a signal comprising first means to produce a first pulse of one polarity and a second pulse of another polarity for every cycle of a signal applied thereto, generator means coupled to said first means to initiate saw-tooth voltage in response to said first pulse, and sampling means having an output and coupled to said first means and to said generator means for sampling the saw-tooth voltage when said second pulse occurs whereby the output of said sampling means is indicative of the period of the signal applied to said first means.

6. Apparatus to measure the period of a signal comprising first means to convert an input signal into a square wave, a differentiator connected to said first means, a triggered blocking oscillator connected to said differentiator, a saw-tooth generator connected to said oscillator, and a sampling circuit connected to said oscillator and to said generator whereby an output of said sampling circuit is proportional to the period of the input signal applied to said first means.

7. The apparatus of claim 6 wherein said sampling means comprises a vacuum tube having an anode, a grid connected to said first means and a cathode connected to said generator means, a diode connected between the cathode and anode of said tube, a first capacitor having one side connected to the cathode of said tube, and a second capacitor connected between the anode of said tube and the other side of said first capacitor.

8. Apparatus to measure the period of a signal comprising a trigger producing circuit to produce pulses indicative of the frequency of the signal applied thereto, a triggered blocking oscillator connected to said circuit, a bootstrap integrator connected to said oscillator, and a sampler circuit connected to said integrator and said oscillator, whereby an output of said sampler circuit is indicative of the period of the signal.

References Cited by the Examiner

UNITED STATES PATENTS

| | | | |
|---|---|---|---|
| 2,581,199 | 1/1952 | Moe | 328—182 |
| 2,891,154 | 6/1959 | Holmes | 329—107 |
| 2,996,665 | 8/1961 | Polen | 328—109 X |

ARTHUR GAUSS, *Primary Examiner.*

JOHN HUCKERT, *Examiner.*

J. ZAZWORSKY, *Assistant Examiner.*